United States Patent

[11] 3,588,371

[72] Inventors Giorgio Dal Monte;
Francesco Motolese, Milan, Italy

[21] Appl. No. 796,054
[22] Filed Feb. 3, 1969
[45] Patented June 28, 1971
[73] Assignee Societa Italiana Telecomunicazioni Siemens S.P.A.
Milan, Italy
[32] Priority Feb. 1, 1968
[33] Italy
[31] 12,280A/68

[54] RADIOTELEPHONE SYSTEM FOR COMMUNICATION BETWEEN A CENTRAL OFFICE AND VEHICLE-BORNE MOBILE UNITS
7 Claims, 4 Drawing Figs.

[52] U.S. Cl. 179/41A, 325/55, 325/64
[51] Int. Cl. H04g 7/04
[50] Field of Search 179/41 A; 325/52, 53, 54, 55, 64, 16, 22, 4; 340/168 (CC)

[56] References Cited
UNITED STATES PATENTS

| | | | |
|---|---|---|---|
| 2,896,072 | 7/1959 | Bachelet et al. | 325/53 |
| 3,458,664 | 7/1969 | Aldhoch et al. | 179/41 |
| 3,314,051 | 5/1967 | Willcox et al. | 325/55UX |
| 3,335,406 | 8/1967 | Clark | 325/55UX |
| 3,375,443 | 3/1968 | Salmet | 325/55 |

*Primary Examiner*—William C. Cooper
*Assistant Examiner*—Jan S. Black
*Attorney*—Karl F. Ross ABSTRACT: Several central offices, adapted to establish radiotelephone communication with mobile units aboard vehicles within their respective areas, cooperate with a common transmitter sending out monitoring signals over a wider region in response to an outgoing call, destined for a mobile unit, arriving at any of these central offices. The mobile unit identified by the call signal responds by transmitting its own identification code to the central office within its area where that code is compared with stored call numbers dialed in by subscribers waiting for connections with various vehicles. If the code matches a stored call number, the user aboard the vehicle is alerted by a visual and/or audible alarm signal triggered by the central office to lift the receiver of the mobile unit in order to talk to the waiting subscriber; if the comparison fails, thus indicating that the call to the mobile unit originated at another central office or that the transmission of the code was initiated aboard the vehicle by a user wishing to communicate with another subscriber, a switching signal is sent out to condition the mobile unit for reception of the dial tone if the receiver thereof is in fact off the hook.

INVENTORS:
Giorgio Dal Monte
Francesco Motolese
BY
Karl G. Ross
Attorney

G. Dal Monte
F. Motolese
INVENTORS.

Karl F. Ross
Attorney

Giorgio Dal Monte
Francesco Motolese
INVENTORS.

BY

Karl G. Ross
Attorney

RADIOTELEPHONE SYSTEM FOR COMMUNICATION BETWEEN A CENTRAL OFFICE AND VEHICLE-BORNE MOBILE UNITS

OUr present invention relates to a radiotelephone system of the type wherein a central office with incoming subscriber lines is adapted to establish talking connections between any of these lines and a mobile unit aboard any of several vehicles within range of a transmitting and receiving station associated with the central office.

When the user of a telephone set aboard an automobile or other moving vehicle desires to communicate with another subscriber at a fixed station, or possibly aboard another vehicle, he picks up his receiver and thereby actuates a transmitter establishing radio contact with a central office within range. A system of this type may include separate receiving equipment aboard such vehicles for a calling signal broadcast from a fixed transmitter, this signal triggering a bell or other audible or visible alarm means to alert the user to the fact that another subscriber is trying to reach him. Because of the relatively simple circuitry needed to receive such a calling signal and to utilize it to actuate a vibrator or a lamp, the region throughout which the calling signal can be radiated is generally much wider than the area of effective communication with a central office via a radio link designed to carry conversation. Thus, it is possible to use a single calling transmitter in association with several central-office broadcasting stations effective over adjoining communication areas; moreover, the user aboard a vehicle is relieved of the need for maintaining the remainder of his equipment energized and ready for operation in the absence of an outgoing or incoming call.

The general object of our present invention is to provide means for automatically switching a mobile unit, normally responsive only to a calling signal, to a conversation channel in response to an incoming call or upon operation by the user of a manual control means, such as the usual receiver hook, to initiate an outgoing call.

Another object is to provide means aboard a vehicle for alerting a user to an incoming call only after a connection has been established via the central office, thereby avoiding unnecessary distraction of the operator (who may be the driver of the vehicle) in cases where the call cannot be completed because the vehicle is outside the broadcasting area of the central-office station.

These objects are realized, pursuant to our present invention, by the provision of identification means aboard a vehicle for generating a code signal individual to the mobile unit thereof in response to a similarly coded monitoring signal sent out by a transmitter independent of that radio link upon the arrival at that central office of a call destined for that particular vehicle; although this monitoring signal will be received by all the vehicle-borne mobile units within the region covered by the calling transmitter, only the unit with the correct identification code will react by retransmitting that code to a central office within range where the code is temporarily stored in a first register for successive comparison with similar codes received by the terminal equipment of the central office from incoming subscriber lines; if the comparison reveals a match between the codes stored in the two registers, the incoming subscriber line is placed in talking communication with the responding mobile unit which at the same time receives a linkup signal triggering the actuation of an alarm aboard the vehicle to alert the operator to the establishment of the connection; up to that time, advantageously, the operation is noiseless and invisible. If, however, the comparison of the temporarily registered codes fails, the central office transmits to the mobile unit a switching signal which, if the receiver of that unit is off the hook, connects the set in a circuit (preferably marked by the appearance of the usual dial tone) which enables the operator aboard the vehicle to select another subscriber station or facility with which he wants to communicate. If the receiver has not been lifted so that the hook switch is open, the connection is terminated as an abortive attempt from a central office out of range to establish telephone communication with the mobile unit.

The term "subscriber line," as herein used, encompasses any communication channel extending from the central office to a local station, to a remote station by way of a trunk line, or to any mobile unit which can be reached from that office with or without the intervention of another central office by radiotelephone.

In practice, the transmitter for the calling signal will generally be positioned at or near the center of an extended region encompassing the broadcasting areas of several central offices each having its own transmit-receive station disposed substantially at the center of its area. The registers for temporarily storing the codes dialed in by the calling subscriber and received from the responding mobile unit may be located at the common transmitter but are more advantageously disposed at the respective central office.

In accordance with conventional telephone practice, the terminal equipment of the central office comprises means for seizing one of several available channels upon the arrival of a call, the system according to our invention thus including two groups of such channels respectively made busy by signals from the mobile units and from the terminating subscriber lines. The first set of channels, which for convenience may be referred to as radio channels, include respective memories forming part of a mobile-unit register; the second set of channels, referred to hereinafter as local channels, include respective memories forming part of an outgoing-call register. Each of these memories, which may be of the binary or the decimal type, includes an individual characteristic switch which is closed whenever seizure of the associated channel is complete. In the case of the mobile-unit register, this switch responds advantageously to a terminal pulse of the identifying code signal to be stored; in the case of the outgoing-call register, the individual switch responds to an extra digit or pulse (e.g. a final "1") added to the multidigit call number to indicate that the call is destined for a mobile unit.

The memories of the mobile-unit registers may be multipled to a common test circuit which allows only one memory at a time, upon closure of its characteristic switch, to seize that circuit for the purpose of initiating a comparison with codes stored in any memory of the outgoing-call register whose characteristic switch is closed to indicate a waiting call destined for a mobile unit. If the comparison is positive, the two channels are interconnected with transmission of a linkup signal via the radio link to the mobile unit involved, the corresponding memories being thereupon deactivated by the opening of their characteristic switches. If the result of the comparison is negative for all busy outgoing-call memories, the hitherto engaged mobile-unit memory is released and a switching signal is sent out to the mobile unit to determine whether the earlier arrival of its identification code was due to an attempted initiation of a call from aboard the vehicle. The emission of this switching signal could be avoided if the code sent from the vehicle upon initiation of a call differed in some significant respect (e.g. by an added digit) from the code transmitted in response to a monitoring signal; this, however, would require more complex equipment at the mobile unit.

The above and other features of our invention will be described in greater detail with reference to the accompanying drawing in which.

Figure 1:
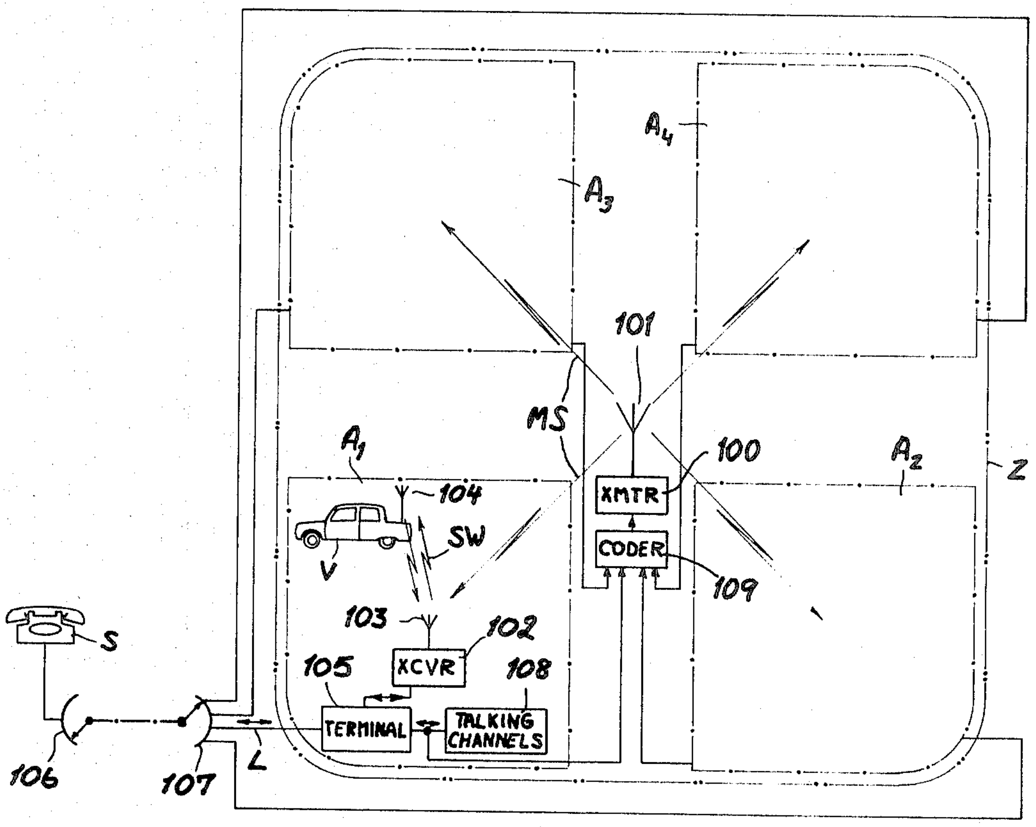
FIG. 1 is a diagrammatic plan view of several radiotelephone areas forming part of a region served by a common calling transmitter.

In FIG. 1 we have shown a zone Z subdivided into several radiotelephone areas $A_1$, $A_2$, $A_3$, $A_4$; in practice, these areas will be somewhat overlapping and more or less circular although, for the sake of clarity, they have not been so illustrated.

A transmitter 100, covering the entire zone Z, has an antenna 101 disposed substantially at the center of that zone to radiate a monitoring signal to any vehicle V within the zone whenever a call for such vehicle arrives at a central office located in one or more of its areas $A_1$—$A_4$. For the sake of simplicity, we have illustrated in FIG. 1 only the central office of area $A_1$ (in which the vehicle V also happens to be located), it being understood that similar equipment exists at each of the other three areas and that, of course, the number of such areas may vary.

The central office of area $A_1$ comprises a transmit-receive station diagrammatically represented by a transceiver 102 having an antenna 103. A similar antenna 104 aboard vehicle V forms the other terminal of a radio link interconnecting station 102 and the mobile unit carried by the vehicle, this radio link generally operating on short waves SW to accommodate the necessary number of voice-frequency bands which accounts for the restricted effective area of the radio link as compared with that of antenna 101 whose monitoring signal may be broadcast at a considerably lower carrier frequency.

The transceiver 102 of the central office is connected to associated terminal equipment 105 including the final selector stage responsive to calls incoming over associated subscriber lines; one such line has been illustrated at L and leads to a subscriber S by way of the usual line finder 106 and another selector stage 107 adapted to extend the call to the central office of any of the four areas shown in FIG. 1. The terminal equipment 105, in turn, works into a set of talking channels 108, more fully described hereinafter with reference to FIG. 2. An output of network 105 leads to a coder 109 associated with the central transmitting station 100, this coder translating the final digit or digits of tee call signal (with the exception of a supplemental digit described hereinafter) into a pulse code modulating the carrier wave radiated by antenna 101.

Briefly, the operation of the system of FIG. 1, in response to a call from a subscriber S (or possibly from a mobile unit establishing a connection with terminal network 105), is as follows:

The incoming call, relayed to transmitter 100, triggers the latter into the emission of a monitoring signal MS containing the identification code of a mobile unit aboard a vehicle V believed to be within the operating area $A_1$ of that central office. The receiving equipment aboard vehicle V responds to that monitoring signal, upon recognizing this code as its own, by retransmitting the same code to station 102 via the radio link represented by antennas 104, 103. Station 102 feeds the retransmitted code to network 108 which, in a manner described in greater detail hereinafter, temporarily stores that code in one of several memories of a register provided for this purpose. Meanwhile, a memory in another register of network 108 has already stored the code received directly from network 105 upon the arrival of the call via line L. Now, the two stored codes are automatically compared and, upon the establishment of their identity, a talking circuit is completed from network 105 via station 102 and antennas 103, 104, with transmission of a ringing or other alarm signal to the mobile unit, so that the user aboard the vehicle V can instantly enter into a conversation with the calling subscriber upon lifting his receiver.

If the vehicle V had been out of range of antenna 103 (as by passing through one of the other areas $A_2$—$A_4$) when picking up the signal from antenna 101, the call would not have gone through and the identification code temporarily stored in network 108 would have been canceled as soon as the calling subscriber S had released the equipment 105 by hanging up his receiver.

If a user aboard vehicle V intends to initiate a call to, say, the subscriber S, he picks up the receiver which results in the automatic transmission of the identification code of his mobile unit to station 102, as in the case previously discussed, whereupon this code is again stored in one of the mobile-unit memories of network 108. Again, a search is automatically started to ascertain whether the code of this mobile unit is already stored in one of the outgoing-call memories of network 108 to await the establishment of a talking connection to vehicle V; if so, the outgoing call takes precedence over the incoming call from the vehicle and is put through in the manner described above. If, however, the code of the calling vehicle is not already stored in the register containing the outgoing-call memories of network 108, the comparison of the contacts of the two registers yields a negative result and causes the generation of a switching signal transmitted via antennas 103, 104 to the vehicle where, in view of the fact that the receiver of the mobile unit is already off the hook, circuits are completed for informing the user (e.g. by way of the customary dial tone) that he may proceed to select the number of the station he wishes to reach.

Figure 2:
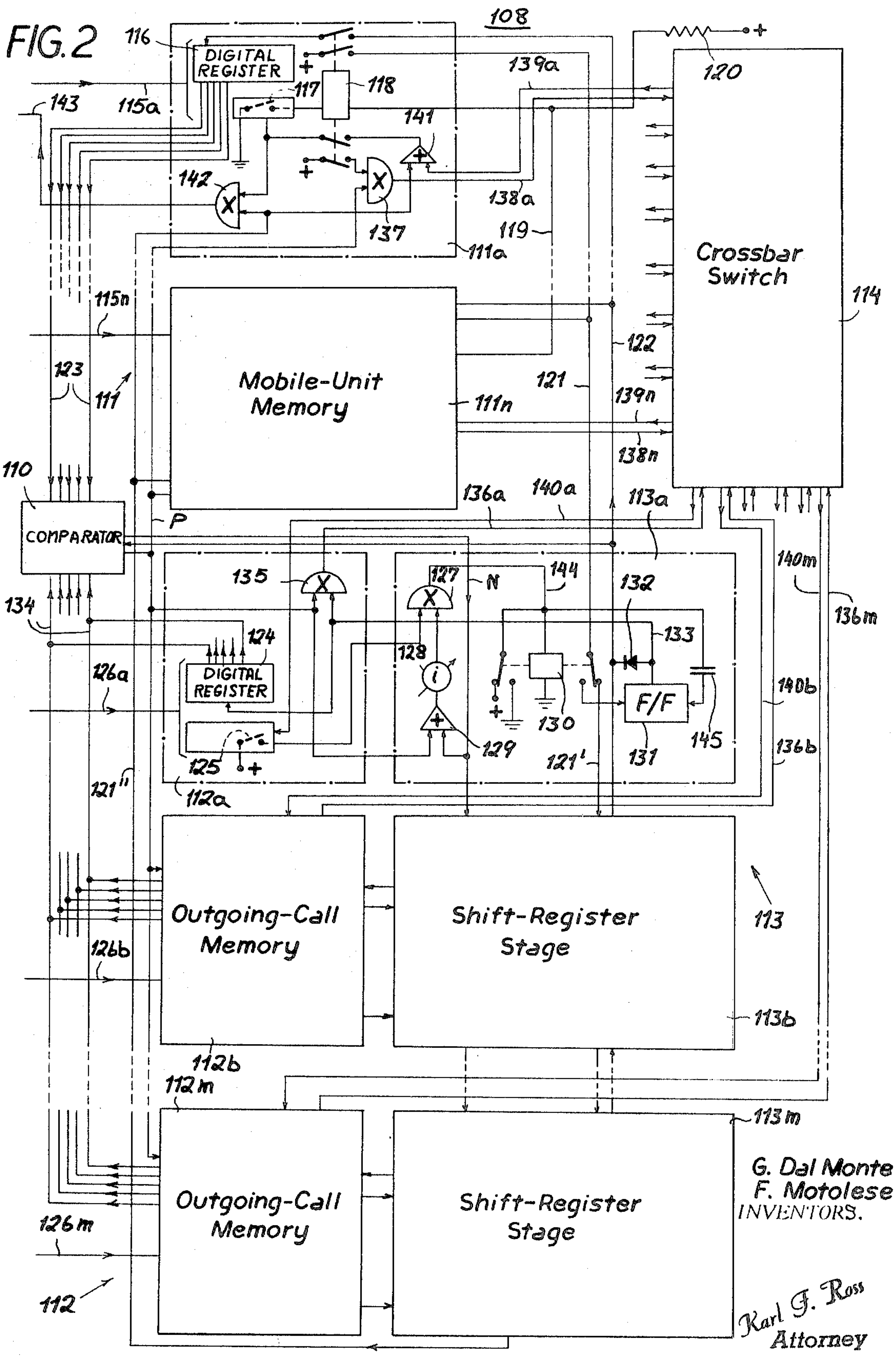
FIG. 2 is a block diagram showing the code registers and associated circuitry of a central office for one of the radiotelephone areas of FIG. 1.

We shall now describe, with reference to FIG. 2, details of the network 108 designed to handle a large amount of traffic. This network comprises a comparator 110, a first register 111 consisting of a plurality of mobile-unit memories **111*a*....111*n*, a second register 112 consisting of a plurality of outgoing-call memories 112*a*, 112*b*,..112*m*, a shift register 113 with a plurality of stages 113*a*, 113*b*,..113*m* individually assigned to the corresponding outgoing-call memories, and a circuit 114 for completing a connection between a local subscriber line (L, FIG. 1) and the telephone set of a mobile unit aboard a vehicle V, the latter circuit being shown as a crossbar switch. Since all the memories 111*a*—111*n* of the first register and all the memories 112*a*—112*m* of the second register as well as the several stages 113*a*—113*m* of shift register 113 are mutually identical, only the first memories 111*a*, 112*a* and the first shift-register stage 113*a*** will be described in detail hereinafter.

Each memory **111*a* etc. of register 111 forms part of a respective channel adapted to be seized by the terminal equipment 105 (FIG. 1) upon the reception of a code signal, identifying a mobile unit, by station 102 via its antenna 103. Seizure of this channel energizes a lead 115*a* terminating at a digital register 116 within memory 111*a*, this register serving to store the identification code which may include an invariable final digit (e.g. of numerical value 1) closing a switch 117 upon completion of such storage. Closure of switch 117 grounds a four-armature relay 118 connected to a test wire 119 to which a live voltage (here positive) is applied by way of a resistor 120. The magnitudes of this resistor and of the voltage drop across the winding of the operated relay 118 are so chosen that no other such relay can operate as long as the relay 118 of memory 111*a* is actuated, test wire 119 being thus representative of any conventional lockout circuit arrangement for preventing the activation of more than one memory at a time. Wire 119 is part of a multiple, common to all the memories of register 111, which further includes a pair of conductors 121, 122 terminating at the front contacts of the two upper armatures of relay 118; conductor 121 receives operating voltage (here positive) upon energization of relay 118 whereas conductor 122 is extended by such operation to an input of register 116 which, when energized, connects the stages of this register to respective wires 123 of a multiple whereby the contents of the register can be read out to one set of inputs of comparator 110**.

Memory **112*a* comprises a similar digital register 124 also having a separate stage for the final digit characterizing the code of a mobile unit, this stage including a normally open switch 125. When a call from a local line L actuates the terminal equipment 105 (FIG. 1) to seize an available memory of register 112, a lead such as wire 126*a* is energized to engage the associated register 124 which thereupon stores the identification code of the called mobile unit. Upon completion of such storage, switch 125 is closed to energize one of two inputs of an AND gate 127 having its other input normally energized through an inverter 128 in the output of an OR gate 129 with input connections to a pair of output leads P and N of comparator 110. With the comparator 110 unoperated at this stage, leads N and P are deenergized. Thus, AND gate 127 conducts and operates a relay 130, forming part of shift-register stage 113*a***, whose right-hand armature, in engaging its front contact, applies positive potential from conductor 121 to the setting input of a flip-flop 131 in the same stage as soon as relay 118 of any memory 111*a*—111*n* is energized in the aforedescribed manner. The set output of flip-flop 131 is tied, through a diode 132, to conductor 122 which, accordingly, initiates the read-out of the code stored in register 116 to comparator 110. The same flip-flop output energizes a lead 133 terminating at an input electrode of digital register 124 which thereupon causes the read-out of the contents of that register to respective wires 134 of a multiple extending to another set of inputs of comparator 110. The comparator, therefore, simultaneously receives the code identifying a mobile unit in communication with station 102 and the code of a mobile unit dialed in by a calling subscriber via line L. At the same time, the pulse on conductor 122 is applied to a further input of comparator 110 to actuate same.

If the two codes are identical, the comparator 110 energizes its output lead P which is further connected to an input of another AND gate 135 having a second input tied to lead 133. Gate 135 thereupon conducts and energizes a lead 136*a* for operating an associated hold magnet of crossbar switch 114. At the same time, through an AND gate 137 in memory 111*a* having a first input connected to potential through the bottom armature of relay 118 and having a second input tied to lead P, a conductor 138*a* is energized to actuate an associated select magnet of the crossbar switch so as to close a circuit between corresponding talking conductors not shown. A relay (not shown) at the junction of the row and the file controlled by the aforementioned select and hold magnets then energizes a further lead 139*a* which, by way of an OR gate 141 in memory 111*a* and the second-lowest armature of relay 118, reopens the switch 117 of register 116 so as to disengage the memory 111*a* from the multiple 119, 121, 122; another output lead 140*a* of crossbar switch 114, concurrently energized by the same junction relay, reopens the switch 125 of register 124 so that memory 112*a* is likewise disconnected from the multiple. The clearing of the other stages of registers 116 and 124 may take place at the same time or thereafter under the control of the terminal equipment 105.

The appearance of a voltage pulse in the input of OR gate 129, owing to the energization of lead P, blocks the AND gate 127 so that relay 130 releases. With relay 118 releasing substantially concurrently, the potential hitherto applied to conductor 121 is not communicated to an extension 121′ of this conductor, leading to the next register stage 113*b*, for a period long enough to set the flip-flop of that stage. The removal of voltage from the output lead 144 of AND gate 127 applies, via a condenser 145, a pulse of proper polarity to the resetting input of flip-flop 131. Thus, the network 108 comes to rest preparatorily to a repetition of the aforedescribed operation upon seizure of multiple 119, 121, 122 by another memory of register 111.

If, on the other hand, the two codes simultaneously applied to comparator 110 do not match, i.e. if the result of the comparison is negative rather than positive, output lead N is energized in lieu of lead P. In this case, too, AND gate 127 is blocked to deenergize relay 130 but the continuing operation of relay 118 now applies voltage to extension 121′ whereby register stage 113*b* responds in the aforedescribed manner if the switch 125 of the associated memory 112*b* is closed to indicate a waiting call. If this switch is open, however, the voltage pulse on lead 121, 121′ is communicated to a stage of shift register 113 further along the line, i.e. the first stage paired with a memory storing the code of a called mobile unit, to initiate another comparison.

If all comparisons fail, or if none of the memories of register 112 contains a stored code as determined by the open condition of their respective switches 115, the pulse on conductor 121 emerges from the last stage 113*m* on an extension 121″ of that conductor which is multipled to all the memories of register 111, terminating at another input of OR gate 141 and at a first input of an AND gate 142 whose second input is energized from that OR gate by way of the second-lowest armature of relay 118. AND gate 142, therefore, conducts and energizes an output lead 143 for a brief period which terminates upon the release of relay 118 due to the substantially concurrent reopening of switch 117 as described above. The pulse on conductor 143 readjusts the terminal equipment 105 (FIG. 1) to transmit a switching signal via antenna 103 over the voice channel which had seized the memory 111*a* for the storage of an identification code, i.e. to the vehicle V of FIG. 1. If the receiver of the telephone set aboard that vehicle is off the hook, this switching signal conditions the set for dialing and transmits to the earpiece of the receiver a dial tone which may be locally generated or radiated from station 102. If, however, the receiver is in place, which may happen if the user had replaced it after the transmission of the code signal, or if the calling subscriber had disconnected his set from the central office after dialing the number of the mobile unit, the switching signal remains ineffectual and the circuits of FIG. 2 return to normal.

Crossbar switch 114, with input leads 136*a*—136*m*, 138*a*—138*n* and feedback leads 139*a*—139*n*, 140*a*—140*m* designated by the same suffixes as the associated memories, is representative of a variety of selective connectors for individually linking any one memory of register 111 with any one memory of register 112.

Figure 3:
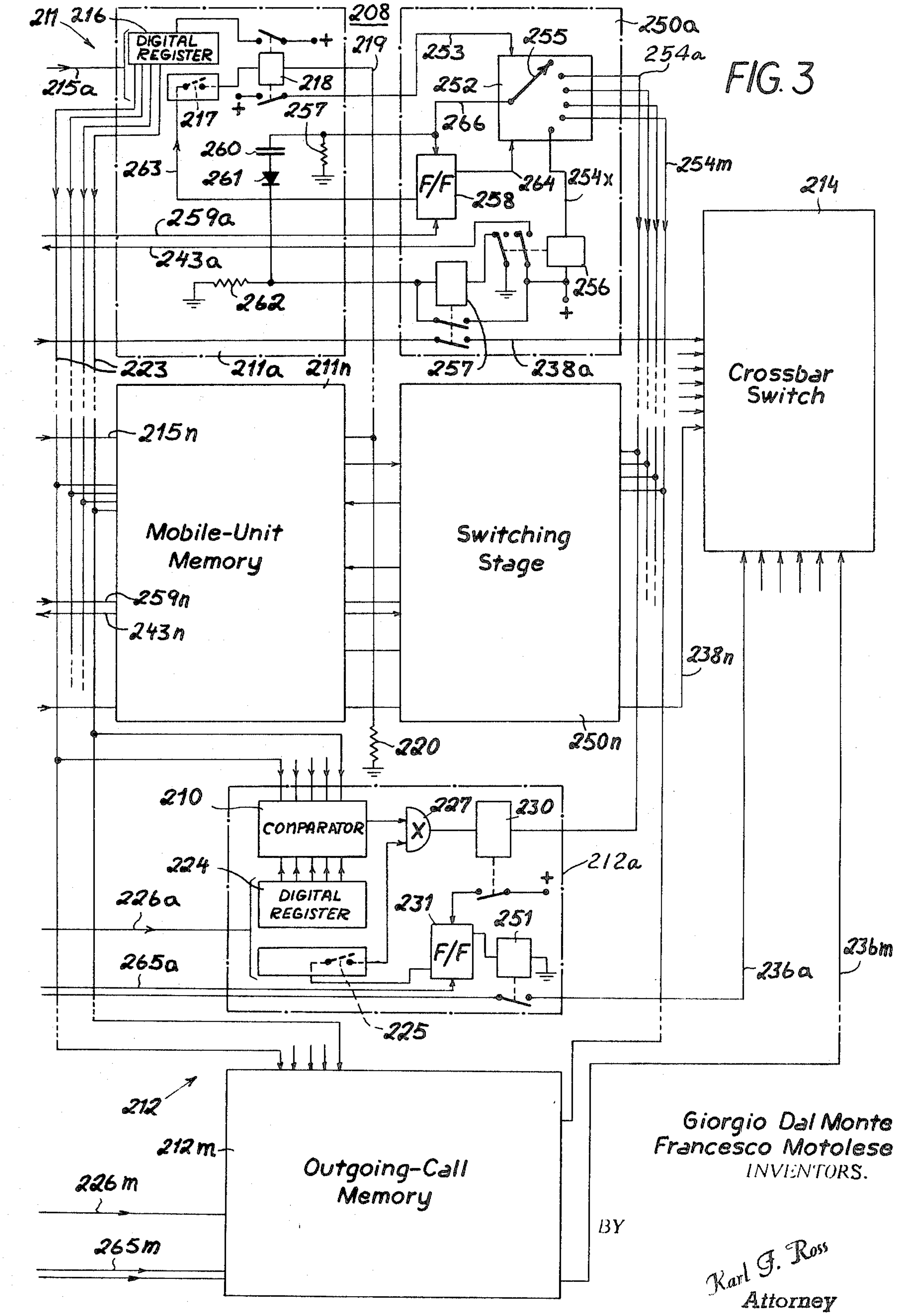
FIG. 3 is a view similar to FIG. 2 showing a modified circuit arrangement.

In systems with relatively light traffic in which the use of a shift register as shown in FIG. 2 would not be economically warranted, a simplified circuit arrangement may be utilized as illustrated at 208 in FIG. 3. This network comprises, again, a first register 211 with stages 211*a*—211*n* and a second register 212 with stages 212*a*—212*m*, together with an associated crossbar switch 214 and several switching stages 250*a*—250*n* individually assigned to memories 211*a*—211*n*. The memories of registers 211 and 212, of which again only the first ones have been illustrated, are generally similar to those of registers 111 and 112. Thus, memory 211*a* comprises a digital register 216 with a switch 217 closable upon completion of storage to energize a relay 218 connected to a common test wire 219 in series with a biasing resistor 220 connected to a terminal (here ground) of a source of operating voltage whose other terminal (+) is connected to several contacts of relay 218; memory 212*a* comprises a similar digital register 224, to be loaded by way of an input lead 226*a*, with an individual switch 225 responsive to the characteristic final digit. The common comparator 110 of FIG. 2 has been replaced by an individual comparator 210 in each memory of register 212, one set of inputs of this comparator being connected to the several stages of the associated register 224 while the other set of inputs are tied to a multiple 223 emanating from the register 216 of each mobile-unit memory 211*a*—211*n*. Memory 212*a* also includes an individual flip-flop 231 settable by a relay 230 upon energization thereof, this relay being actuatable by the output of an AND gate 227 having respective inputs connected to the output of comparator 210 and, by way os switch 225, to the reset output of flip-flop 231. The set output of this flip-flop energizes a further relay 251 having an armature and front contact connected in an operating lead 236*a* for an assigned hold magnet of crossbar switch 214. Flip-flop 231 is resettable, upon the release of the memory, by a signal from network 105 (FIG. 1) transmitted to it over a lead 265*a*.

Switching stage 250*a* includes a stepping switch 252 with a wiper 255 adapted to be advanced under the control of a lead 253 extending from the lower armature of relay 218 whose upper armature, in the actuated condition of the relay, applies positively potential to register 216 to read out its contents via multiple 223 to all the comparators 210 connected thereto. The bank contacts of switch 252 are connected to respective output leads 254*a*—254*m*, multipled to all the stages 250*a*—250*n*, which terminate at the relays 230 of corresponding memories 212*a*—212*m*. Thus, an operating circuit for one of these relays is completed to ground by way of the wiper 255, a lead 266 connected thereto, and a resistor 257 whenever this wiper stands on a contact leading to a memory of register 212 wherein the gate 227 is unblocked by closure of its switch 225 and an output of its comparator 210 indicating identity between the two codes applied to its inputs. A further bank contact of switch 252 is connected to a lead 254*x* serving for the energization of a relay 256 which, upon operating, partly completes a circuit for the emission of a switching signal via a lead 243*a* for the purpose described above, this circuit also including an armature and ground contact of a further relay 257. The latter, when actuated, energizes an operating lead 238*a* for an assigned select magnet of crossbar switch 214.

Conductor 266 is also connected to the setting input of a flip-flop 258 adapted to be reset by a signal from the terminal equipment 105 (FIG. 1) transmitted over a wire 259*a* when the stage 250*a* is to be released. Relay 257 is operable, in the released stage of relay 256, in response to a pulse generated by a differentiation circuit including a condenser 260, a diode 261 and a resistor 262 upon the application of voltage to lead 266, i.e. concurrently with the setting of flip-flop 258.

In operation, it is again assumed that at least one of the mobile-unit memories of register 211, e.g. memory 211*a*, has been made busy by a signal arriving from network 105 over an input wire 215*a* and that, upon storage of the code of a mobile unit upon its register 216 with consequent closure of switch 217, its relay 218 has found the test wire 219 idle so as to operate and to lock out the remaining memories of this register. Operating voltage is applied to relay 218 at this time from the reset output of flip-flop 258 connected through a wire 263 to switch 217. The upper armature of relay 218 now triggers the register 216 so as to read out its contents through the multiple 223 to the comparators 210 of all the memories of register 212. When the lower armature of relay 218 engages its front contact, switch 252 is stepped until its wiper 255 reaches a bank contact connected to a memory of register 212 whose relay 230 has voltage applied to it by AND gate 227 as described above. At that instant the flip-flop 258 is set so that relay 218 releases and arrests the switch 252 while terminating the readout of the code of register 216 to all the comparators 210. The ensuing operation of relay 230 sets the flip-flop 231 to actuate the relay 251, with concurrent deenergization of relay 230 since switch 225 receives its operating voltage from the reset output of flip-flop 231 in the same manner as described for the switch 217 and the flip-flop 258. Relay 251 energizes the lead 236*a* to operate the corresponding hold magnet of crossbar switch 214; at the same time, the associated select magnet is operated via lead 238*a* upon the energization of relay 257 by the pulse generated during the setting of flip-flop 258. Relay 257, via its second armature, locks to positive voltage by way of a back contact and armature of relay 256.

The setting of flip-flop 258 also energizes a lead 264 which restores the switch 252 to its home position as soon as the corresponding junction of crossbar switch 214 has been made busy to link the talking conductors of the local line L and of the voice-frequency channel established by the equipment 105 between the mobile unit aboard vehicle V and the central office including the network 208. As described above, this completion of a talking connection transmits a ringing signal to the user aboard the vehicle and eventually releases the memories 211*a* and 212*a*.

If no match is found to exist, under the circumstances described in connection with FIG. 2, wiper 255 is stepped onto its last contact to operate the relay 256 so as to prevent the energization of relay 257 upon the concurrent setting of flip-flop 258. Relay 256 energizes the conductor 243*a* to transmit a switching signal to the mobile unit for the purpose previously set forth.

The input leads to crossbar switch 214 have been designated in FIG. 3 analogously to those of crossbar switch 114 in FIG. 2.

Figure 4:
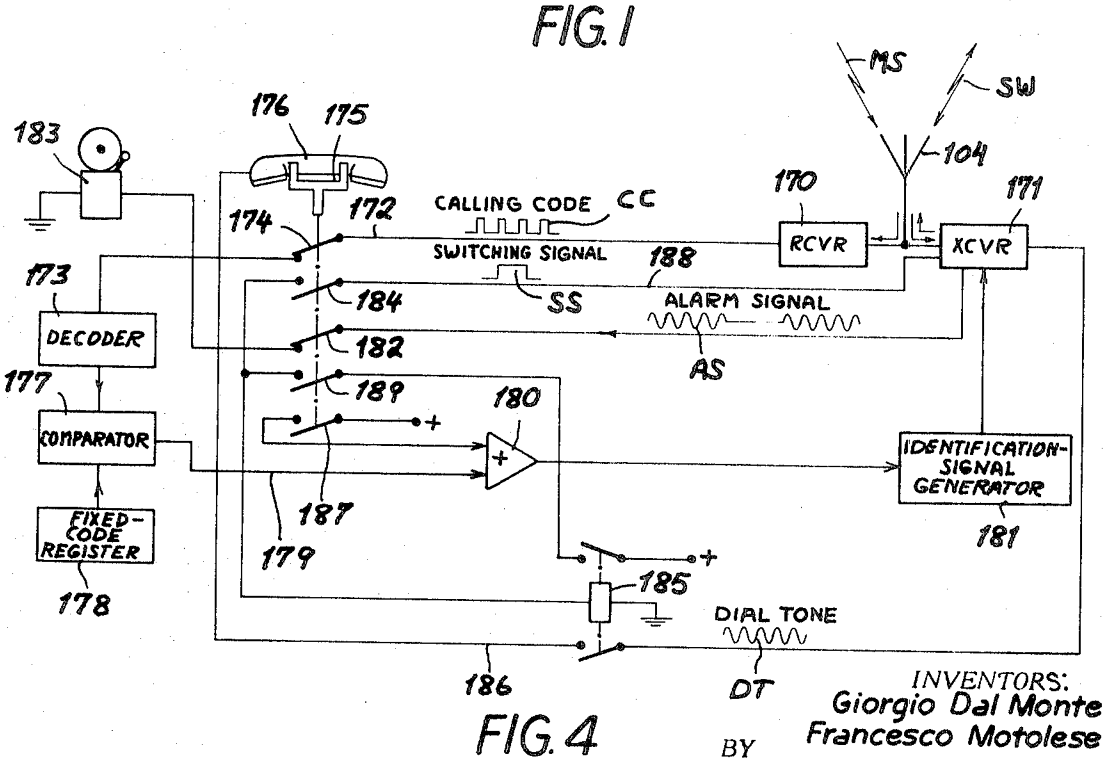
FIG. 4 shows details of the equipment of a mobile unit aboard a vehicle included in the system of FIG. 1.

FIG. 4 illustrates the circuitry of the mobile unit aboard vehicle V whose antenna 104 cooperates with a receiving network 170, tuned to the monitoring signal MS from transmitter 101, and with a transmit-receive network or transceiver 171 designed for short wave communication (SW) with the fixed station 102 of FIG. 1. The monitoring signal detected by network 170 includes the calling code CC of a mobile unit which, via a conductor 172, is delivered to a decoder 173 in the closed stage of a switch 174 controlled by the hook 175 of the handset 176 of the mobile unit. A comparator 177, receiving the output of decoder 173 as well as that of a fixed code register 178 containing the identifying digits of this particular unit, responds to a match by energizing a lead 179 passing through an OR gate 180 to a signal generator 181 which thereupon delivers the same identification code to the network 171 for transmission to station 102 by way of radio link SW.

If the network 108 (or 208) of the central office completes the connection to a calling subscriber line, a confirmatory signal from station 102 actuates the network 171 to emit an alarm signal AS which, by way of a normally closed switch 182 actuated by the hook 175, operates a call indicator here shown as a bell 183. If the receiver 176 is lifted so that switch 182 is open, closure of another switch 184 connects a relay 185 to a current source (not shown) in transceiver 171 to complete a talking connection 186 between components 176 and 171.

If, in the absence of an incoming call from the central office, the user at the mobile unit lifts the receiver 176 to initiate an outgoing call, a further hook switch 187 energizes the signal generator 181 through OR gate 180 to transmit the identifying code to station 102. Since in that case a switching signal SS arrives from the central office as previously described, this signal appearing on a lead 188 connected to switch 184, closure of the latter switch again energizes the relay 185 to complete the aforedescribed connection between components 176 and 171. In this case, however, the conductor 186 delivers first a dial tone DT to the receiver 176 preparatorily to the placing of an outgoing call from the mobile set.

Relay 185 is shown provided with a holding circuit including a further hook switch 189 which is opened whenever the user redeposits the receiver 176.

We claim:

1. In a radiotelephone system comprising a central office with terminal equipment, subscriber lines leading to said terminal equipment, mobile units aboard vehicles identified by individual codes, and a transmit-receive station connected to said terminal equipment forming part of a radio link for establishing telephone communication with any of said mobile units within a predetermined area, in combination:

transmitter means independent of said radio link connected to said terminal equipment for receiving therefrom the code of a mobile unit called by one of said subscriber lines and for sending said code as part of a monitoring signal to all vehicles within a region encompassing said predetermined area;

identification means in each mobile unit provided with actuating means for transmitting via said radio link a radio signal including said code;

circuit means in each mobile unit for actuating said identification means in response to a monitoring signal bearing the code assigned to such unit;

first register means connected to said station for temporarily storing the code of said radio signal;

second register means connected to said terminal equipment for temporarily storing the code of an incoming call signal from any of said subscriber lines;

comparison means connectable to both said first and second register means for determining a match between the codes stored thereby;

circuitry at said central office controlled by said comparison means upon seizure of said first register means by a mobile unit for transmitting to said mobile unit, via said station and radio link, a switching signal in response to the absence of a match between the stored code of said mobile unit and the code of any incoming call signal stored in said second register means, said first register means comprising a plurality of first memories forming part of respective radio channels individually seizable by different mobile units via said radio link, said second register means comprising a plurality of second memories forming part of respective local channels individually seizable by different calling subscriber lines, each of said memories including an individual switch closable upon the storage of a code therein; said comparison means including a test circuit engageable by a single first memory upon closure of said individual switch thereof and scanning means responsive to such engagement for comparing the code stored in said single first memory with the codes of successive second memories having said individual switches thereof closed, said scanning means terminating the comparison upon ascertainment of a match; and switch means at said central office controlled by said comparison means for establishing a talking connection between a calling subscriber line and a called mobile unit in response to such match.

2. The combination defined in claim 1 wherein said first and second register means and said comparison means are located at said central office, said transmitter means being disposed at a location remote from said central office.

3. The combination defined in claim 1 wherein said actuating means includes a normally open hook switch closed by a user initiating a call, further comprising switchover means at each mobile unit effective upon closure of said hook switch for establishing an outgoing-call connection through said radio link to said central office in response to said switching signal.

4. The combination defined in claim 1 wherein said scanning means comprises a shift register with respective stages in said local channels individually coupled to said second memories for selective bypassing in the open state of the corresponding individual switches thereof, said test circuit upon engagement by said single first memory delivering to an input of said shift register a trigger pulse for successively activating all but the bypassed stages thereof to compare the codes of the associated second networks with that of said single first memory until a match is found, said circuitry being responsive to a final pulse from the last activated stage of said shift register for generating said switching signal.

5. The combination defined in claim 4 wherein said comparison means further comprises a single comparator common to all said first and second memories, said scanning means including leads energizable upon activation of any of said stages for delivering to said comparator the code of said single first memory and the code of the second memory associated with the activated stage.

6. The combination defined in claim 1 wherein said comparison means comprises individual comparators in said second memory connected to receive the code stored in said single first memory and stepping means for consecutively sampling the comparators of all second memories having said individual switches closed, said circuitry being responsive to the lapse of a time interval sufficient to sample all said comparators for generating said switching signal.

7. The combination defined in claim 1 further comprising alarm means aboard each vehicle nonresponsive to said monitoring signal but actuatable by a linkup signal from said central office indicating the establishment of a talking connection by said switch means.